United States Patent [19]

Howard et al.

[11] 4,225,389

[45] Sep. 30, 1980

[54] NUCLEAR REACTOR CONSTRUCTIONS

[75] Inventors: Roy S. Howard, Warrington; Donald Hodgson, Ormskirk; James G. Dale, Stockton-on-Tees; Clifford T. M. Hall, Sedgefield, all of England

[73] Assignee: Nuclear Power Company Limited, London, England

[21] Appl. No.: 872,821

[22] Filed: Jan. 27, 1978

[30] Foreign Application Priority Data

Feb. 15, 1977 [GB] United Kingdom ............... 6302/77

[51] Int. Cl.² ............................................. G21C 13/02
[52] U.S. Cl. ........................................ 176/40; 176/87
[58] Field of Search ..................... 176/40, 61, 50, 65, 176/62, 63, 38, 64, 87

[56] References Cited

FOREIGN PATENT DOCUMENTS 2315054 1/1977 France .................... 176/DIG. 2
1210357 10/1970 United Kingdom ............ 176/38

Primary Examiner—Harvey E. Behrend
Attorney, Agent, or Firm—Larson, Taylor and Hinds

[57] ABSTRACT

The core tank of a liquid metal cooled fast breeder reactor of the pool kind has thermal insulation cladding its inner wall surface. The thermal insulation comprises a plurality of spaced layers of stainless steel sheet material each layer comprising rectilinear panels in spaced array in vertical and horizontal rows. Closure members of cruciform shape close the spaces between adjacent panels.

7 Claims, 5 Drawing Figures

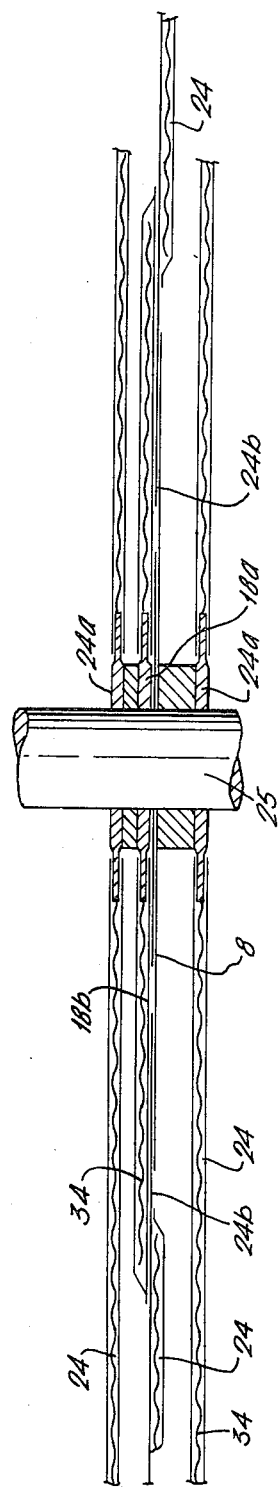

NUCLEAR REACTOR CONSTRUCTIONS

BACKGROUND OF THE INVENTION

This invention relates generally to nuclear reactor constructions but is primarily directed to thermal insulation for use in liquid metal coolant of fast breeder nuclear reactor constructions.

In one known construction of liquid metal cooled nuclear reactor a fast breeder fuel assembly is submerged in a pool of liquid metal coolant in a primary vessel which is housed in a concrete vault. The fuel assembly is carried by a strongback and is surrounded by a barrier defining an inner or hot region of the pool and an outer or cool region of the pool. There are coolant pumps in the outer region which circulate coolant upwardly through the fuel assembly by way of the strongback thence to heat exchangers in the hot region which discharge to the cool region. During operation of the reactor the temperature of the hot region is approximately 540° C. and that of the cool region approximately 370° C. The barrier comprises an impermeable wall or inner tank and in order to reduce the complex stresses in the wall due to the temperature differential across it and to reduce temperature degradation of the hot region coolant the inner surface of the wall is clad with thermal insulation. Several forms of thermal insulation have been used or proposed but for various reasons have proved unsatisfactory. One form of insulation comprises spaced sheets of stainless steel defining a radial series of compartments in which liquid coolant will stagnate each sheet comprising a pair of membranes welded together face-to-face in quilted pattern manner but there is difficulty in the pre-operation testing of this material and in use superficial thermal expansion sets up complex stresses in the material. Another form of insulation comprises a layer of stainless steel blocks attached to the wall surface and covered with a stainless steel membrane but this kind of insulation is expensive.

An object of the invention is to provide a nuclear reactor construction in which a wall surface is clad with thermal insulation which is capable of being prefabricated in standardised units and then installed in the construction without substantial need for further fabrication.

SUMMARY OF THE INVENTION

According to the invention in a nuclear reactor construction having a wall surface clad with thermal insulation, the insulation comprises a plurality of spaced layers of sheet material, each layer lying substantially parallel to the wall surface and comprising rectilinear panels secured to the wall surface in spaced array in vertical and horizontal rows, and closure members for the spaces therebetween, the closure members being of cruciform shape and the arms thereof being arranged to overlap opposed faces of adjacent panels.

Thermal insulation of this kind forms a substantial barrier to flowing coolant and has adequate clearances distributed over the area of each layer to allow superficial thermal expansion to take place without causing distortion of the layer or setting up complex stresses. The panels and closure members may be prefabricated then assembled in the reactor construction without need for further fabrication. In the event of failure of the attachment of a panel to the wall surface the released panel is retained in position by the adjoining panels and closure members thus providing for reliability in service.

The invention will reside in a liquid metal cooled fast breeder nuclear reactor of the kind comprising a fast breeder fuel assembly submerged in a pool of liquid metal coolant within a primary vessel, a barrier surrounding the fuel assembly thereby defining inner and outer regions of the pool and a coolant pump in the outer region for circulating coolant through the fuel assembly and through a heat exchanger disposed in the inner region, and wherein the inner wall surface of the barrier is clad with thermal insulation comprising a plurality of spaced layers of sheet material, each layer lying substantially parallel to the wall surface and comprising rectilinear panels secured to the wall surface in spaced array in vertical and horizontal rows, and closure members for the spaces therebetween, the closure members being of cruciform shape and the arms thereof being arranged to overlap opposed faces of adjacent panels.

DESCRIPTION OF THE DRAWINGS

Constructions of liquid metal cooled fast breeder nuclear reactor embodying the invention are described, by way of example, with reference to the accompanying drawings wherein, FIG. 5 is a fragmentary plan view of an alternative construction, the plan view being of similar section to that shown in FIG. 3.

DESCRIPTION OF THE PREFERRED EMBODIMENTS

Figure 1:
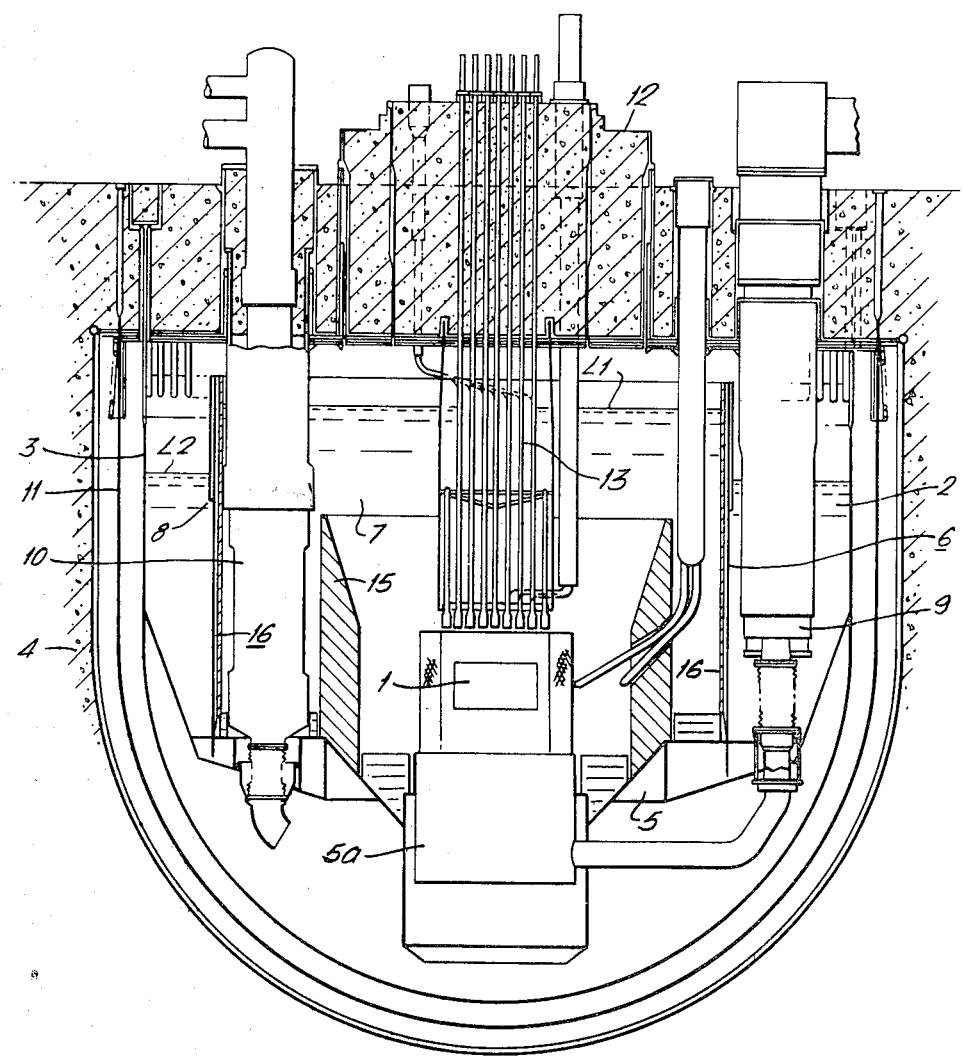
FIG. 1 is a sectional view of the construction.

In the construction shown in FIG. 1 a nuclear reactor fuel assembly 1 is submerged in a pool of liquid sodium coolant 2 in a primary vessel 3 which is housed in a concrete vault 4. The fuel assembly is carried by a strongback 5 and is surrounded by a barrier 6 which defines inner and outer regions 7, 8 of the pool. There are eight coolant pumps 9 (only one being shown in FIG. 1) in the outer region 8 for circulating coolant through the fuel assembly by way of a diagrid 5a and thence to eight heat exchangers 10 (again only one being shown in FIG. 1) disposed in the inner region 7. The heat exchangers finally discharge the coolant into the outer region. The primary vessel 3, a leak jacket 11 for the primary vessel, the strongback 5, heat exchangers 10 and coolant pumps 9 are all suspended from the roof of the vault and the roof includes a double rotating shield 12 from which control rods 13 extend to the top of the core. A neutron shield 15 surrounds the fuel assembly within the barrier 6 and the internal wall surface of the barrier is clad with thermal insulation 16. A secondary liquid sodium coolant flowing through the heat exchangers conveys the heat energy derived from the fuel assembly to steam generating plant not shown in the drawings.

In operation of the reactor, the coolant in the inner region of the pool is at temperature approximately 540° C. and that in the outer region is at temperature approximately 370° C. The pressure differential across the inlet and outlet ports of the pumps 9 causes a differential in the levels of the coolant in the regions the levels being designated L1 and L2.

Figure 2:
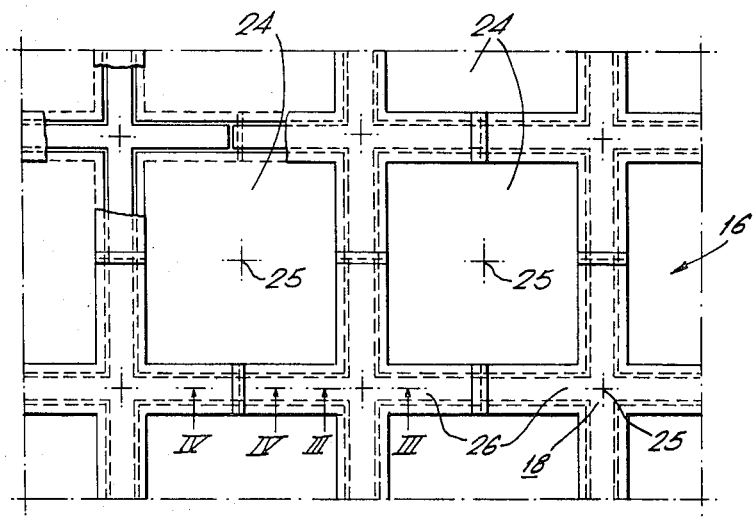
FIG. 2 is a fragmentary front view of thermal insulation used in the construction of FIG. 1.
Figure 3:
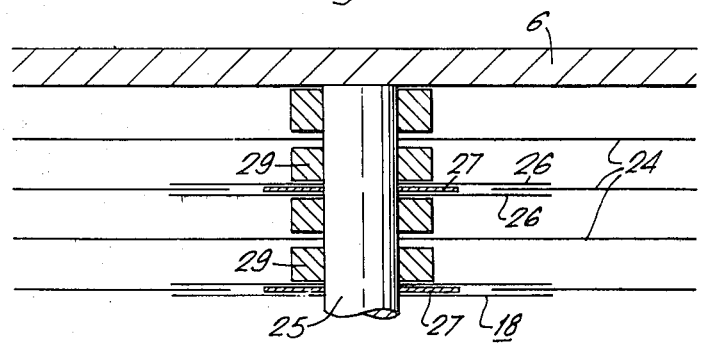
FIG. 3 is a fragmentary plan view in section on line III—III of FIG. 2.
Figure 4:
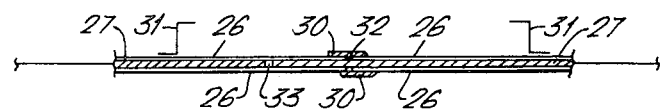
FIG. 4 is a fragmentary plan view in section on line IV—IV of FIG. 2.

The thermal insulation 16 comprises a plurality of spaced layers of stainless steel sheet, each layer lying substantially parallel to the wall surface and comprising rectilinear panels secured to the wall surface in spaced array in vertical and horizontal rows. The spaces between adjacent panels are closed by members of cruciform shape the arms of the members being arranged to overlap opposed faces of adjacent panels. As shown in detail in FIGS. 2, 3, and 4 the rectilinear panels designated 24 are secured to the internal wall surface of the barrier 6 by central retaining studs 25. The spaces between the panels are closed by closure members 18 secured to the wall by further studs 25. The closure members 18 are of cruciform shape each comprising a cruciform spacer 27 intermediate a pair of cruciform sealing strips 26. The inner (relative to the wall surface) cruciform strip 26 of each member is welded to the spacer 27 whilst the outer is free for assembly after placing the complementing panels 24. The sealing strips 26 of each member 18 are disposed to overlap opposed faces of adjacent panels 24 and each arm of the cruciform member co-operates with an arm of a neighbouring cruciform member to extend along and overlap adjacent sides of adjacent panels. The combination of cruciform strips 26, spacer 27 and panel 24 form a labyrinth barrier serving to restrict flow of coolant through each layer of panels. The studs 25 are arranged in two lattices of square pitch, one lattice being displaced relative to the other by one half pitch in both horizontal and vertical directions and each stud carries alternately a panel 24 and a closure member 18 so that the vertical rows of panels in one layer are displaced relative to the vertical rows of panels in an adjacent layer, the displacement being one half of the pitch of the rows in both horizontal and vertical directions. By displacing the panels in one layer relative to the panels in an adjacent layer coolant flow across the insulation due to convection currents is reduced.

The panels are 0.9 meters square and 0.55 mm thick, and are disposed on a 1 meter square lattice pitch. The cruciform strips of the sealing members are 0.55 mm thick and the cruciform spacing members are 0.70 mm thick. Stud spacers 29 10 mm thick serve to space to the closure members part.

A clearance 32 is provided between the ends of the arms of the cruciform strips to provide for thermal expansion but the joints are closed to fluid flow by lapping strips 30 attached to selected arms of the cruciform strips. Two of the arms of each spacer 27 are longer than the other two, long and short arms of adjoining strips being assembled together and providing an expansion clearance 33 which is displaced from the expansion clearance 32 of the strips. Spacers 31 are also attached to selected arms of the cruciform strips to hold adjacent strips of adjacent membranes in place.

In an alternative construction of liquid metal cooled fast breeder nuclear reactor generally similar to that described in respect of the first embodiment of the invention the panels 24 each comprise two opposed membranes of stainless steel sealed together along their edges to define a sachet which is charged with inert gas.

As shown in FIG. 5, the panels 24 and closure members 18 are each adapted to engage a stud 25 by central bosses or hubs, designated 24a, 18a respectively, and the peripheral regions 24b of the panels 24 are extended by a single thickness of membrane to complement the closure members 18. One of the cruciform strips designated 18b of each closure member is also of sachet form so that, in effect, substantially the full area of each layer of insulation comprises a gas filled layer. The inert gas contained in the sachets is argon at sub-atmospheric pressure under external conditions of normal temperature and pressure and each sachet contains dimpled stainless steel foil 34 which serves as stiffening against collapse of the thin walls of the sachet. For this reason each sachet is also seam welded in quilt like manner to form a plurality of compartments.

Thermal insulation of the described forms provides a substantial barrier to flow of coolant and accommodates superficial thermal expansion. The expansion is accommodated by the clearances between the panels and closure members and thereby substantially avoids distortion and complex stresses. The insulation is easily erected because the components are small and can be handled by an operator and components can be readily repaired or replaced on site.

We claim:

1. A nuclear reactor construction comprising a wall and thermal insulation cladding a surface of said wall,
   the thermal insulation comprising a plurality of spaced layers of material lying substantially parallel to the wall surface,
   each layer of material comprising a plurality of rectilinear panels secured to the wall surface in spaced array in vertical and horizontal rows, and
   closure members for the spaces between the panels, said closure members being cruciform in shape, the edges of adjacent panels being received in elongate channels formed by the longitudinal edges of the arms of the cruciform-shaped closure members whereby peripheral face regions of both sides of each panel in an array are overlapped by the sides of the channels, the cruciform members and panels being stacked and arranged so that successive superposed arms of a stack of cruciform members overlap peripheral regions of both faces of successive panels in an adjacent stack, the panels being spaced from the walls and bases of the channels thereby to create labyrinth barriers to fluid flow through the spaced layers.

2. A nuclear reactor construction according to claim 1 wherein each closure member comprises a pair of superposed cruciform sealing strips and a cruciform spacer disposed intermediate the sealing strips, the sealing strips of each closure member being disposed such that they form the sides of the channels to overlap the peripheral face regions of both sides of complementary panels, and each arm of the cruciform member co-operating with an arm of a neighbouring cruciform member to extend along and overlap adjacent sides of adjacent panels.

3. A nuclear reactor construction according to claim 1 wherein the vertical rows of panels in one layer are displaced relative to the vertical rows of panels in an adjacent layer, the displacement being one half of the pitch of the rows in both horizontal and vertical directions.

4. A nuclear reactor construction according to claim 3 wherein the thermal insulation comprises stainless steel.

5. A nuclear reactor construction according to claim 4 wherein the panels each comprise two opposed membranes sealed together along their edges to define a sachet, and an inert gas enclosed within the sachet.

6. A nuclear reactor construction according to claim 4 wherein the nuclear reactor is of the liquid metal cooled fast breeder kind comprising a fast breeder fuel assembly submerged in a pool of liquid metal coolant within a primary vessel, a barrier surrounding the fuel assembly thereby defining inner and outer regions of the pool and a coolant pump in the outer region for circulating coolant through the sub-assembly and through a heat exchanger disposed in the inner region and wherein the inner wall surface of the barrier is clad with said thermal insulation.

7. A nuclear reactor construction according to claim 5 wherein the nuclear reactor is of the liquid metal cooled fast breeder kind comprising a fast breeder fuel assembly submerged in a pool of liquid metal coolant within a primary vessel, a barrier surrounding the fuel assembly thereby defining inner and outer regions of the pool and a coolant pump in the outer region for circulating coolant through the sub-assembly and through a heat exchanger disposed in the inner region and wherein the inner wall surface of the barrier is clad with said thermal insulation.

* * * * *